United States Patent [19]

Asmuth

[11] 4,348,554

[45] Sep. 7, 1982

[54] METHOD OF PROVIDING VIRTUAL PRIVATE NETWORK TELEPHONE SERVICE

[75] Inventor: Richard L. Asmuth, Oldbridge, N.J.

[73] Assignee: Bell Telephone Laboratories, Incorporated, Murray Hill, N.J.

[21] Appl. No.: 132,534

[22] Filed: Mar. 21, 1980

[51] Int. Cl.³ .................... H04M 3/42; H04M 7/00; H04M 15/00

[52] U.S. Cl. .............................. 179/18 B; 179/8 A; 179/18 DA; 179/18 EA

[58] Field of Search ............. 179/18 EA, 18 C, 18 B, 179/18 ES, 8 A, 18 DA, 18 D, 18 AG

[56] References Cited

U.S. PATENT DOCUMENTS

| | | | |
|---|---|---|---|
| 3,150,236 | 9/1964 | Gorgas et al. | 179/18 E |
| 3,157,743 | 11/1964 | Avery | 179/8 A |
| 3,188,396 | 6/1965 | MacFarlane | 179/18 AH |
| 3,309,467 | 3/1967 | Gorgas et al. | 179/18 EA |
| 3,749,845 | 7/1973 | Fraser | 179/18 EA X |
| 3,760,105 | 9/1973 | Puccini | 179/8 A |

OTHER PUBLICATIONS

"A Sophisticated Switched Service", Katz et al., *Bell Laboratories Record*, Feb. 1979, pp. 38–45; Modifying No. 1 ESS for Enhanced Private Network Service, Anderson and Lambert, *Bell Laboratories Record*, Feb. 1979, pp. 46–52.

*Primary Examiner*—Thomas W. Brown
*Attorney, Agent, or Firm*—J. W. Herndon

[57] ABSTRACT

A method is disclosed for providing private network types of telephone services via the public switched network without having it provide private hardware facilities. The method is described with respect to a telephone system comprising plural telephone stations and offices, a data base, and a data communications network connecting some of the offices to the data base. Information is stored at the data base defining a virtual private network. The information includes a description of the bounds of the virtual network and its capacity in terms of virtual telephone facility resources of a prescribed type. In response to a call directed to the virtual network, a verification is made at the data base that this call is entitled to complete via the virtual network and that an idle virtual resource is available for assignment to the call. The idle resource is assigned to the call, and the call is completed via the public switched network.

28 Claims, 13 Drawing Figures

FIG. 8

CUSTOMER NETWORK TABLE (CNT) — 30

| | | | |
|---|---|---|---|
| | 0 | PIN | TERMINATING CUSTOMER TABLE POINTER-TCT | 31
| | 1 | | TRUNK TABLE POINTER-TT | 34
| PRIN. PLANT | 2 | 817 | SERVICE TABLE POINTER-STI |
| W. CONST DIST. | 3 | 206-865 | ST2 |
| H.Q. | 4 | 714-361 | ST3 | 33
| E. CONST SALES | 5 | 904-767 | ST2 |
| | 6 | | END OF TABLE MARKER |

OFF-NETWORK CALL TABLE (ONCT) — 32

| | |  |
|---|---|---|
| 0 | 206-865 | ST2 |
| 1 | 714-361 | ST3 |
| 2 | 904-767 | ST2 |
| 3 | 714-526-6789 | ST4 |
| 4 | END OF TABLE MARKER | |

ST1

| | 35 SC | 36 CD | 37 LOC | 38 CBO | 39 |
|---|---|---|---|---|---|
| 0 | | | — | | VTG 1 |
| 1 | END OF TABLE MARKER | | | | |

ST2

| | 35 | 36 | 37 | 38 | |
|---|---|---|---|---|---|
| 0 | 3 | 3 | BAND 3 | | VTG 2 |
| 1 | 2 | 3 | LOC 212 | | VTG 3 |
| 2 | END OF TABLE MARKER | | | | |

ST3

| | 35 | 36 | 37 | 38 | |
|---|---|---|---|---|---|
| 0 | 1 | 3 | — | | VTG 1 |
| 1 | END OF TABLE MARKER | | | | |

ST4

| | | | | | |
|---|---|---|---|---|---|
| 0 | 2 | 2 | 206-865 | | VTG 4 |
| 1 | 2 | 2 | 904-767 | | VTG 4 |
| 2 | END OF TABLE MARKER | | | | |

METHOD OF PROVIDING VIRTUAL PRIVATE NETWORK TELEPHONE SERVICE

TECHNICAL FIELD

The invention pertains to telephone systems in general and particularly to an arrangement for providing virtual private network types of services via the public switched telephone network.

BACKGROUND OF THE INVENTION

The modern telecommunications business customer has available an array of telephone services aimed at providing alternative ways of providing toll telephone service. Among the various alternatives available are private networks, private tie lines and trunks, foreign exchange services, wide area telephone services such as INWATS, and direct distance dialing over the public network. Many business customers attempt to minimize their telephone costs by purchasing a combination of these services in accordance with their needs. In addition, commercial devices are available which attempt to minimize the cost of using the various facilities and services a customer may have purchased by automatically routine calls via the cheapest route. These devices are typically called WATS boxes. While WATS boxes work well for any given configuration of services, because of the complexity involved in evaluating the merits of alternative configurations for certain customers under varying conditions, it is often difficult to determine in the first instance if a configuration is in fact the most economical for a customer's needs.

In addition, once a configuration of services is selected, it is usually excessively expensive and wasteful to provide sufficient dedicated facilities in the configuration to adequately handle peak traffic loads. Conversely, poor service may result during peak traffic periods if minimum facilities are purchased by a customer.

Attempts have been made to solve these problems by providing arrangements whereby overflow calls on private networks and the like are switched onto the public network. Such an arrangement in a private network is disclosed in U.S. Pat. No. 3,150,236, which issued to J. W. Gorgas on Sept. 22, 1964. According to the patent teaching, in addition to the charge for private network services, a record of a call spilling over from the private network to the public network is made in the office where the spillover occurs so that the customer may be additionally billed for the call portion on the public network.

U.S. Pat. No. 3,157,743, which issued to R. C. Avery on Nov. 17, 1964, discloses an improvement to the above call spillover arrangement. The Avery improvement provides a centralized record of call data pertaining to calls diverted from a private network to the public network. This substantially improves the billing aspects of call spillover.

U.S. Pat. No. 3,188,396, which issued to G. F. MacFarlane on June 8, 1965, discloses an arrangement which attempts to improve the efficiency of foreign exchange service by sharing toll facilities for both ordinary toll traffic and foreign exchange calls.

Although the above arrangements are useful, the provision of same to customers in conjunction with private facilities remains costly to telephone companies and, therefore, to customers. This is caused, in part, by the fact that private facilities can only be accessed from specific locations predefined by the customer.

In view of the above, it is apparent that a need exists to reduce the cost of providing private facilities, to simplify the procedure by which a customer may tailor its telephone services to assure cost minimization, and to further improve dedicated facility service.

SUMMARY OF THE INVENTION

The foregoing problems are solved, and a technical advance is achieved in a method of providing private network types of services via the public switched network. The method operates in a system comprising a plurality of telephone offices, prescribed stations, and a data base accessible by the offices. Information is stored at the data base defining a virtual private network. The information includes a description of the capacity of the virtual network in terms of virtual telephone facility resources of a prescribed type. In response to a call received at one of the offices directed to the virtual network, a verification is made at the data base that the call is entitled to be completed via the virtual network and that an idle virtual resource remains for assignment to the call. The idle virtual resource is assigned to the call, and the call is completed via the public switched network.

A first indication of the number of telephone facility resources allocated for calls between the prescribed stations is stored at the data base. A second indication is also stored representing the number of such resources that are actively assigned to calls at any given time. The first and second indications are compared to determine if the capacity of the virtual network will be exceeded by allowing a call; the call is completed over the public network if the completion will not cause the number of actively assigned resources to exceed the number of allocated resources.

In the preferred embodiment, the telephone offices have access, directly or indirectly, to the data base over a data communications network, which is illustratively the Common Channel Interoffice Signaling system (CCIS). The CCIS system is provided by Western Electric Company, Inc., and is a data communications network which interconnects telephone offices nationwide. It is used primarily for signaling between offices during the establishment of telephone calls. The CCIS system is described in 57 Bell System Technical Journal No. 2, page 230, et seq.

At least one virtual trunk group associated with each virtual private network is maintained in storage at the data base. A virtual trunk group comprises one or more memory blocks each representing a virtual trunk. Details identifying a specific call assigned to a virtual trunk are stored in the respective memory block. When a call is directed to the virtual private network, the appropriate virtual trunk group is interrogated to determine if an idle virtual trunk remains in the group. If so, it is assigned to the call; call identity data is stored in the virtual trunk, and the aforementioned second indication is updated to reflect the new call. The call is then completed in a conventional manner over the public network.

The allocated and actively assigned telephone facility resources identified by the first and second stored indications, respectively, may be stated in terms of a number of calls, a number of total call miles pertaining to a virtual trunk group, or in terms of any other resource that may be desired.

The information stored at the data base also defines the metes and bounds of the virtual private network. The metes and bounds may be quite flexible. Any station may be designated as being on the virtual private network. In fact, for this disclosure stations are designated as being on the network for the purpose of initiating calls or on the network for the purpose of receiving calls. In other words, certain stations defined as being on the network may be authorized to initiate calls on the network to other identified stations. The latter stations are not classified as being either on or off the network. Certain identified stations also defined as being on the network may be allowed to receive network calls from other stations which are not classified as being either on or off the network. It is understood that these definitions are arbitrary and are only intended to aid the understanding of the disclosure and claims.

In accordance with the preferred embodiment, the information stored at the data base defining the virtual private network for any given customer includes a first set of information identifying a plurality of first groups of stations that are on the network for purpose of initiating calls. A second set of stored information identifies for each first group one or more second groups of stations that may be called via the network by the first group.

A third set of information identifies a plurality of third groups of stations that are allowed to receive calls on the network; a fourth set of information identifies for each of the third groups other groups of stations that may call stations of the third groups. Depending upon the needs of the customer, parts or all of the third or fourth sets of information may be common.

In the preferred embodiment, the groups of stations may be illustratively defined by telephone area code, by area code plus office code, by individual directory number, and by arbitrary codes defining prescribed geographic areas. A calling station might be defined as being on the network by virtue of its private branch exchange directory number, for example, and the stations it may call might be defined in terms of service areas such as WATS bands. A virtual private network might include nationwide calling or called access for certain stations, point-to-point traffic between certain stations or groups of stations, and WATS band type of access for certain stations or groups.

BRIEF DESCRIPTION OF THE DRAWINGS

In the drawings:

FIGS. 8 and 9 illustratively show memory tables at the data base which define the metes and bounds of the virtual private network for the hypothetical corporate customer. In particular, FIG. 9 shows a plurality of virtual trunk groups for the customer;

FIG. 10 shows a miscellaneous memory table used by the data base program;

DETAILED DESCRIPTION

Figure 1:
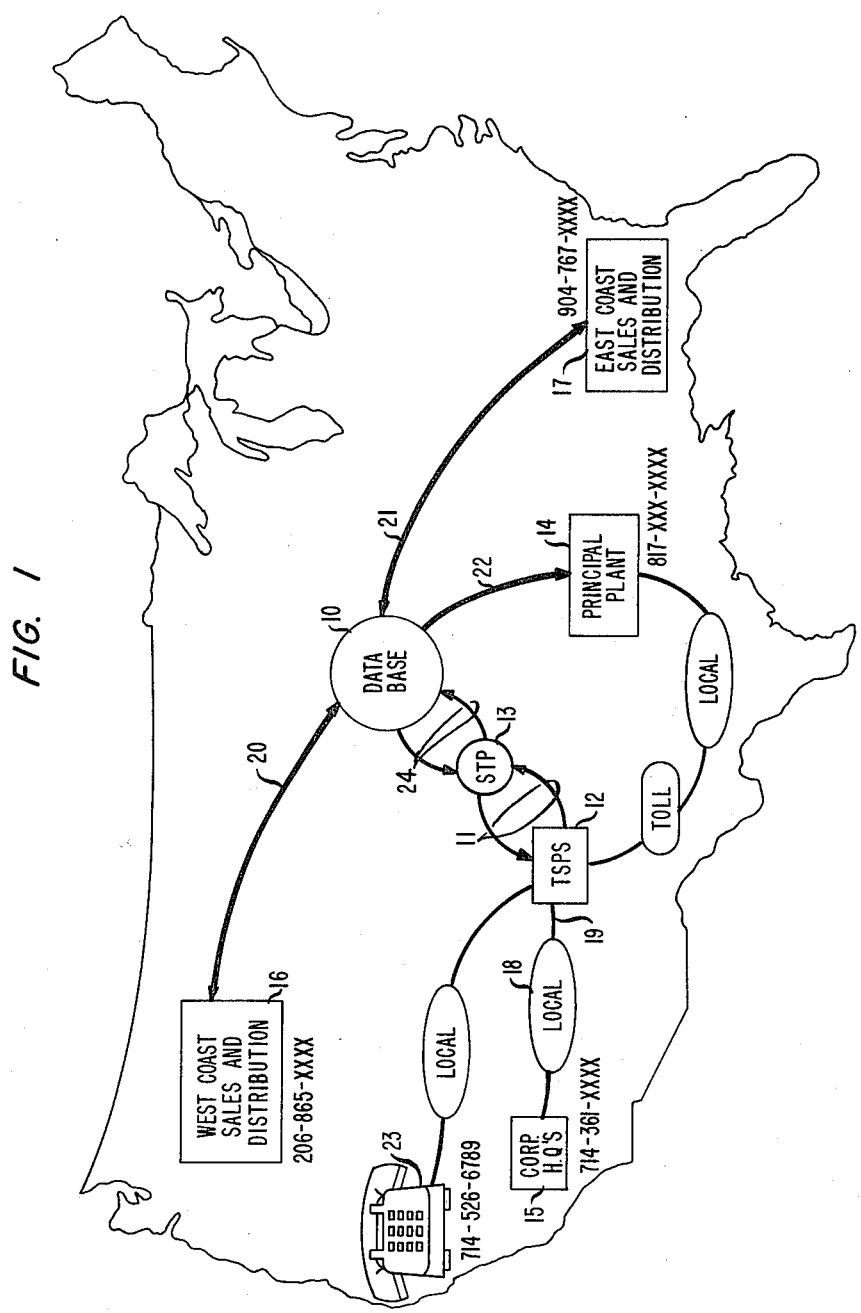
FIG. 1 shows in block diagram form a plurality of telephone offices, part of the CCIS system, a data base, and a plurality of locations of a hypothetical corporate customer used to describe the invention.

With reference to FIG. 1, the invention is described in an illustrative embodiment in which a centralized data base 10 contains in memory storage call information pertaining to numerous customers at different geographical locations. The data base 10 can be accessed from telephone offices via the CCIS system. One CCIS connection comprises data links 11 and 24, a Signal Transfer Point (STP) 13, and interface arrangements (not shown) at data base 10 and TSPS (Traffic Service Position System) 12 all interconnecting the data base and TSPS. The heavily lined connections 20, 21, and 22 in FIG. 1 are intended to represent other portions of the CCIS system and telephone facilities such as other TSPSs and local offices. These connections symbolically form communication channels between the indicated places in FIG. 1 and data base 10 similar to the channel comprising local office 18, TSPS 12, data links 11 and 24, and STP 13.

The CCIS system is essentially a packet data switching arrangement. Packet data switching facilities are disclosed, for example, in A. E. Fraser, U.S. Pat. Nos. 3,749,845 of July 31, 1973 and 3,979,733 of Sept. 7, 1976.

STP 13 is a data message routing facility which may or may not be required in any given CCIS signaling connection. STPs other than STP 13 shown in FIG. 1 exist in the nationwide CCIS system. Their purpose is to provide economical data communications between the numerous telephone offices and data bases such as 10. An STP comprises a processor, memory facilities and a program to translate incoming data messages to determine the routing of the messages to their destination. The STP is discussed in more detail in 57 Bell System Technical Journal No. 2, February 1978, page 263, et seq.

Data base 10, by way of example, may comprise a Western Electric Company, Inc., 1A processor (disclosed in 56 Bell System Technical Journal No. 7, February 1977), equipped with random access and disc storage, and a system of programs to establish, edit, interpret, and manage information stored in memory. It is equipped via a peripheral unit bus (disclosed in 57 Bell System Technical Journal No. 2, February 1978) which facilities for communication with STP 13 and the telephone toll network.

A TSPS, such as TSPS 12, is an operator and automatic services facility described in detail in U.S. Pat. Nos. 3,484,560 to Jaeger et al, issued on Dec. 16, 1969; 4,031,324 to Dudonis, issued on June 21, 1977; and 4,054,756 to Comella et al, issued on Oct. 18, 1977. It comprises a processor, memory, software program, switching network, and other equipment for automatically handling certain types of calls. It also interfaces callers with operator positions for semiautomatic handling of calls which require operator assistance.

By way of example, a hypothetical corporate telephone customer is used to describe the invention; the customer is assumed to have its principal plant 14 in Texas, a corporate headquarters 15 in California, a West Coast sales and distribution center 16 in Washington, and an East Coast sales and distribution center in Florida. The principal plant 14 and the corporate headquarters 15 are assumed to be served by private branch exchanges (PBX) equipped with Direct Inward Dialing (DID) from the public network. The distribution centers 16 and 17 may, for example, be served by PBXs, individual telephone lines or key systems.

It is assumed that the corporate customer has analyzed its telephone needs and has found that the principal plant 14 and several nearby corporate satellites (not shown) generate substantial telephone traffic to all parts of the nation but receive relatively little nationwide traffic in comparison to its generated traffic. The corporate headquarters 15 generates and receives substantial nationwide traffic. Traffic to and from the West and East Coasts distribution centers 16 and 17 is limited primarily to the western and eastern halves of the nation, respectively. Both centers, however, have substantial two-way traffic to the New York City area. In addition, the president of the corporation wants his principal residence, illustrated by station 23, in California to be accessible from all corporate locations on any corporate network that may be planned.

Figure 9:
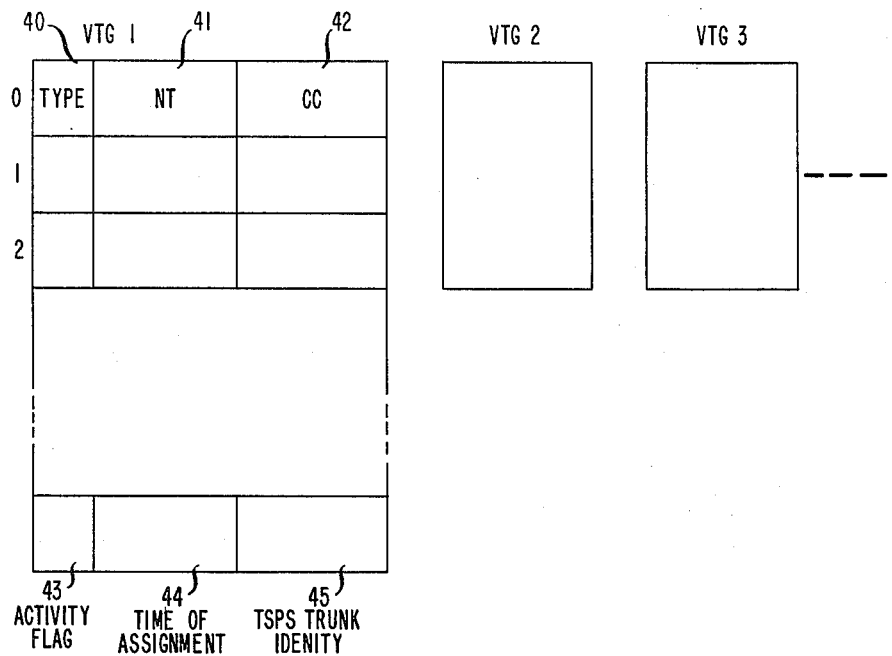

The invention allows a flexible virtual private network to be easily designed to fill the corporation's needs. Data base 10 stores information describing a virtual network for the corporation and a program to interpret the records. Illustrative memory table layouts for storing the information for the corporate customer are shown in FIG. 8 through 10. FIG. 8 shows a Customer Network Table (CNT), an associated table referred to as the Off-Network Call Table (ONCT), and a plurality of Service Tables (STs) ST1 through ST4. Similar tables would exist for other customers.

Word 0 of CNT contains a slot 30 in which is stored an illustrative four-digit Personal Identification Number (PIN) assigned to or selected by the corporation. The PIN is used, as will be described, to verify that proper parties are attempting to access the virtual network.

Slot 31 of CNT word 0 contains the memory address of the Off-Network Call Table (ONCT).

Word 1 of CNT contains the memory address 34 of a table referred to as the Trunk Table (TT). This table is used in connection with the termination of calls as will be explained hereinafter.

Words 2 through 5 of CNT form a portion of the table that is interrogated to determine if calls are originated from stations defined as being on the virtual network. Slot 32 of each word 2 through 5 illustratively contains the digits of an area code, an area code and office code, or a complete station number, respectively defining a geographical area, telephone office, or individual station. A calling station is said to be on the network if it is encompassed within a station group defined by the contents of any of the slots 32 of CNT. For example, according to slot 32 of CNT word 2, all stations in area code 817 are on the network. In accordance with slot 32 of word 3, all stations having the area code and office code 206-865 are also on the network.

Slot 33 of each CNT word 2 through 5 contains a memory address, called a service table pointer, which points to a service table in memory associated with the geographic region, office, or station defined in slot 32 of the word. The service table identified in any word 2 through 5 of CNT, such as ST1 addressed in slot 33 of word 2, contains additional information describing the virtual private network. A number of illustrative service tables ST1 to ST4 are shown in FIG. 8; the service tables will be described completely below.

The words of ONCT have the same lay-out as words 2 through 5 of CNT. ONCT is interrogated when calls are placed from stations off the network. A station is determined to be off the network when it does not fall within one of the groups defined by slots 32 of CNT. Slot 32 of each word of ONCT contains a geographic region, offices, or individual station numbers which define stations that are on the network for the purpose of receiving calls. A slot 33 on ONCT also associates each geographic region, office, or station with a service table. It may be noted that with this memory organization originating on-network stations may be different from terminating on-network stations.

With reference to service table ST1, for example, a service table comprises one or more memory words, each describing certain allowable telephone services and a pointer to a Virtual Trunk Group (VTG) in which a record is maintained of all calls in progress which are assigned to that VTG. Slot 35 of ST1 contains a service code indicator SC. By way of example, the value "1" in SC indicates that nationwide calling access is allowable. A "2" in SC indicates that point-to-point calling is allowable. Point-to-point calling is similar to a private trunk group between two locations. In reality, however, it is much more versatile since a point or location may be identified as an area code, office, or station. A "3" in SC indicates that a service similar to Wide Area Telephone Service (WATS) is allowable. Finally, a "4" in SC indicates that a mileage-controlled virtual trunk group applies to this word of the service table. In the disclosed embodiment, if a VTG is not a mileage-controlled VTG, it is assumed to be a call-controlled VTG. These types of VTGs are described in detail below.

Slot 36 of each word of a service table contains a call direction indicator (CD) which is used to indicate whether a station on the network is allowed to receive calls, to originate calls or both. Illustratively, CD=1 means that on-network stations may originate calls; CD=2 means that on-network stations may receive calls, and CD=3 means that on-network stations may initiate or receive calls. Slot 37 contains a location indicator L0C which, depending on the circumstances, identifies stations that may be called by on-network stations, or stations that may call on-network stations. If SC contains a "3," indicating a WATS-type service, L0C contains an indication of the allowable calling or called area. As an illustration of how this type of service might be provided, an allowable area is assumed in the preferred embodiment to coincide with the service areas, or bands, defined for conventional WATS service. These bands are arranged roughly in concentric circles around a home area. Band 1, for example, usually includes states contiguous to a home state. Band 2 usually includes band 1 plus certain other surrounding states and so on through band 5 which includes the continental United States excluding the home state.

If SC specifies a point-to-point service (SC=2), L0C contains an area code, an area code and office code, or a complete station code, from which or to which calls may be directed depending on the state of CD. L0C has no meaning if SC=1 (nationwide access) or 4 (mileage-controlled VTG).

Slot 38 contains an indicator, referred to as a call blocked option indicator, which specifies the action to be taken in the event a call is blocked because of the lack of trunks in a virtual trunk group. For example, a call may be denied, or it may be overflowed to the public network or to other virtual trunk groups.

Each word of a service table contains a memory address in slot 39 which points to a virtual trunk group specified by the customer. For example, slot 39 of ST1 contains a pointer to Virtual Trunk Group 1 (VTG1).

Each of the tables CNT, ONCT, and the service tables are terminated by a word, such as CNT word 6, containing an end-of-table marker. The marker may be an "all-zero" state of the word. The program looks for the marker as it interrogates these tables to determine when it has exhausted a table.

Figure 11:
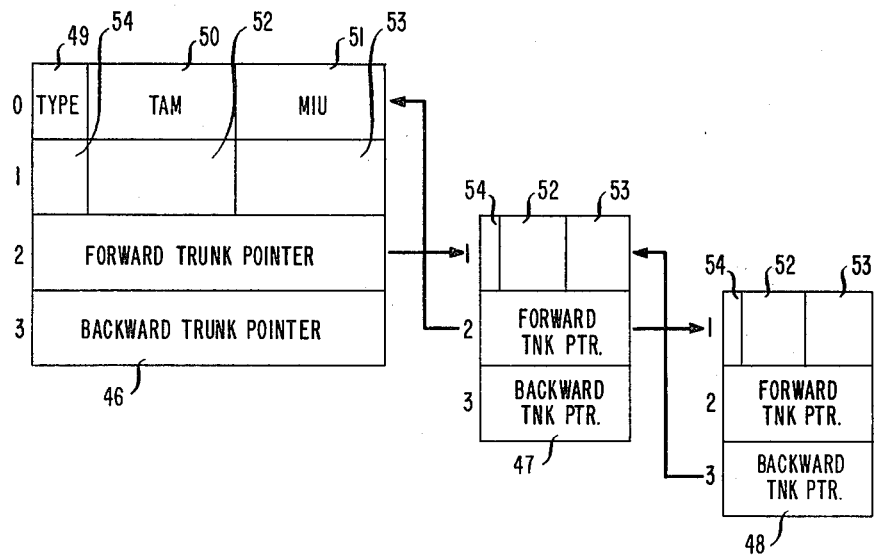
FIG. 11 shows one alternative type of virtual trunk group in which the assignment of telephone facility resources is based on call miles.

VTG1 and other call-controlled VTGs are shown in FIG. 9. These VTGs are similar to each other except for their respective sizes (number of virtual trunks). Therefore, only the details of VTG1 are shown. An illustrative mileage-controlled VTG is shown in FIG. 11.

With reference to FIG. 9, word 0 of VTG1 contains a TYPE indicator 40 which identifies the VTG as call controlled, a slot 41 (NT) containing the total number of virtual trunks in the group, and a slot 42 (CC) containing a count of the total number of virtual trunks of the group assigned to calls at any given time. The remaining words 1, 2, etc., of VTG1 each represent a different virtual trunk (VT). A separate call may be assigned to each VT. Each VT contains an activity flag in slot 43, a slot 44 for storing a time to a call, and a slot 45 for storing the identity of a TSPS trunk used in routing the call. The activity flag of a VT is set to "1" if the VT is assigned to a call; it is set to "0" if the trunk is idle. The assigned time and TSPS trunk identity uniquely identifies a call as will be seen.

The organization of a mileage-controlled VTG is somewhat different from a trunk-controlled VTG because the number of calls that may be simultaneously in progress cannot be accurately described except in terms of the total mileage of all active calls assigned to the VTG. Therefore, there is not a fixed number of words assigned to such a group. FIG. 11 shows one illustrative organization of a mileage-controlled VTG. The specific example shown contains, by way of example, three active virtual trunks 46, 47, and 48. Word 0 of the first virtual trunk 46 is a header type for the VTG and contains a TYPE indicator 49 identifying the VTG as mileage controlled. A slot 50 (TAM) stores the maximum call mileage that may be in use on the VTG as any given time. A slot 51 (MIU) stores the call miles currently in use on the VTG. All other virtual trunks which may become active in this VTG do not have an equivalent word 0. Word 1 of each virtual trunk contains a slot 52 for storing the time of assignment of the trunk to a call and a slot 53 for storing the identity of a TSPS trunk used in routing the call. A slot 54 stores the call miles relating to a call that is assigned to a VT.

Words 2 and 3 of each virtual trunk are used to link virtual trunks together as they are assigned to calls. Specifically, each word 2 contains a forward trunk pointer, which is a memory address of the next virtual trunk in the list. Each word 3 contains a backward trunk pointer, which is a memory address of the preceding virtual trunk in the list. This organization allows as many trunks to be active in the VTG as needed, limited only by the amount of memory space available for representing the virtual trunks.

In the specific example shown in FIG. 11, the forward trunk pointer of VT 46 points to VT 47. The forward trunk pointer of VT 47 points to VT 48. Since VT 48 is the last VT in the list its forward trunk pointer contains an end marker, such as an all zero state, to indicate this. The backward trunk pointer of VT 48 points to VT 47, and the backward trunk pointer of VT 47 points to VT 46. Because VT 46 is always the first VT, its backward trunk pointer always contains an end marker. The backward and forward trunk pointers of appropriate VTs are modified as needed when new VTs are assigned to or removed from the list in response to the origination or termination of calls.

The specific contents of the Customer Network Table, the Off-Network Call Table and the service tables of FIG. 8, considered with the virtual trunk groups of FIG. 9, form a network which might be selected by our hypothetical corporate customer shown in FIG. 1. For example, according to word 2 of CNT, corporate callers in area code 817 (see slot 32), which encompasses the principal plant 14 and several corporate satellites (not shown), are linked to service table ST1 (see slot 33). According to ST1, these callers are entitled to nationwide (SC=1), originating (CD=1) service by means of VTG1 (see slot 39). Corporate parties at the West Coast distribution site 16 (area code 206, office code 865—see CNT word 3, slot 32) are entitled by word 0 of ST2 to originating and terminating (CD=3) WATS type traffic (SC=3) in band 3 (L0C=3) via VTG2. These same corporate parties are entitled by word 1 of ST2 to originating and terminating (CD=3) point-to-point traffic (SC=2) to New York City (L0C=area code 212). Parties at the East Coast distribution site 17 are entitled to the same type of service (see CNT word 5). Callers at corporate headquarters 15 (see slot 32 of CNT word 4) are linked to ST3 which allows nationwide (SC=1), originating and terminating (CD=3) traffic via VTG1.

Calls from stations not encompassed by the identifications in slots 32 of CNT are screened through the Off-Network Call Table (ONCT) by comparing the called station digits to the contents of ONCT slots 32. The format of ONCT is the same as the format of CNT. In the illustrative ONCT of FIG. 8, it is seen that the principal plant in area code 814 is not encompassed by any of the slots 32. The principal plant is therefore not entitled to receive traffic by means of the corporate network unless the calls are authorized by means of CNT and the service tables. It may also be seen from word 3 of ONCT that the corporate president, whose residence telephone number is assumed to be 714-526-6789, is entitled to receive certain traffic at his residence. With reference to ST4, which is contained in slot 33 of ONCT word 3, it is seen that the president may receive point-to-point traffic (SC=2) from office 865 in area code 206 (word 0), and from office 767 in area code 904 (word 1). Because the headquarters 15 and principal plant have nationwide calling access by virtue of the CNT tables, the president may also receive calls from those locations.

In addition, according to words 0 and 2 of ONCT, the East Coast and West Coast distribution centers 16 and 17 may receive calls from WATS band 3 stations (ST2 word 0) or traffic from area code 212 (word 1). According to ONCT word 1 and ST3, corporate headquarters 15 may receive calls from any station in the nation.

The invention is now further described by reference to the flow diagrams of FIGS. 2 to 7 in conjunction with an example in which it is assumed that a caller at station (714) 361-1234 at corporate headquarters 15 is initiating a call to a station (904) 767-1212 at the East Coast distribution center 17. The flow diagrams of FIGS. 2 to 7, it is recalled, represent a control program at data base 10 for controlling the operations of a processor thereat.

To initiate the call, the caller removes his station handset and, in response to dial tone from local office 18, keys-in the digits 0+904-767-1212 (the called station area code and number). The "0" directs local office 18 to route the call via the nearest TSPS. In response, local office 18 seizes an outgoing trunk 19 to TSPS 12. When TSPS 12 notifies office 18 that it is ready to receive information, office 18 outpulses the keyed-in digits to the TSPS.

The initial "0" also informs TSPS 12 that additional digits are to follow. The TSPS prompts the caller by means of an announcement or tone that it is ready to receive the additional digits. The caller thereafter keys-in the digits of an account number and a four-digit Personal Identification Number (PIN). The account number may, in fact, be a telephone company credit card number, if desired. As will be seen, the PIN is used by data base 10 to verify that the caller is entitled to charge calls to the account number. The account number might be 205-497-3434-1112, and the PIN might be 3313, for example. TSPS 12 also obtains the directory number of the calling station from office 18, which has identified the number by means of its Automatic Number Identification (ANI) equipment. TSPS 12 next selects an outgoing trunk on which to eventually route the call, and it assigns the current time as the time of assignment of the trunk to the call. The trunk selection and the time are used to identify the call as will be seen.

A data message including the calling and called station numbers, the account number, PIN, the TSPS trunk identity, and the assigned time are transmitted by TSPS 12 to data base 10 by means of data link 11, STP 13, and data link 24. At the data base, the program beginning at START in FIG. 2 is executed in response to the data message.

Figure 2:
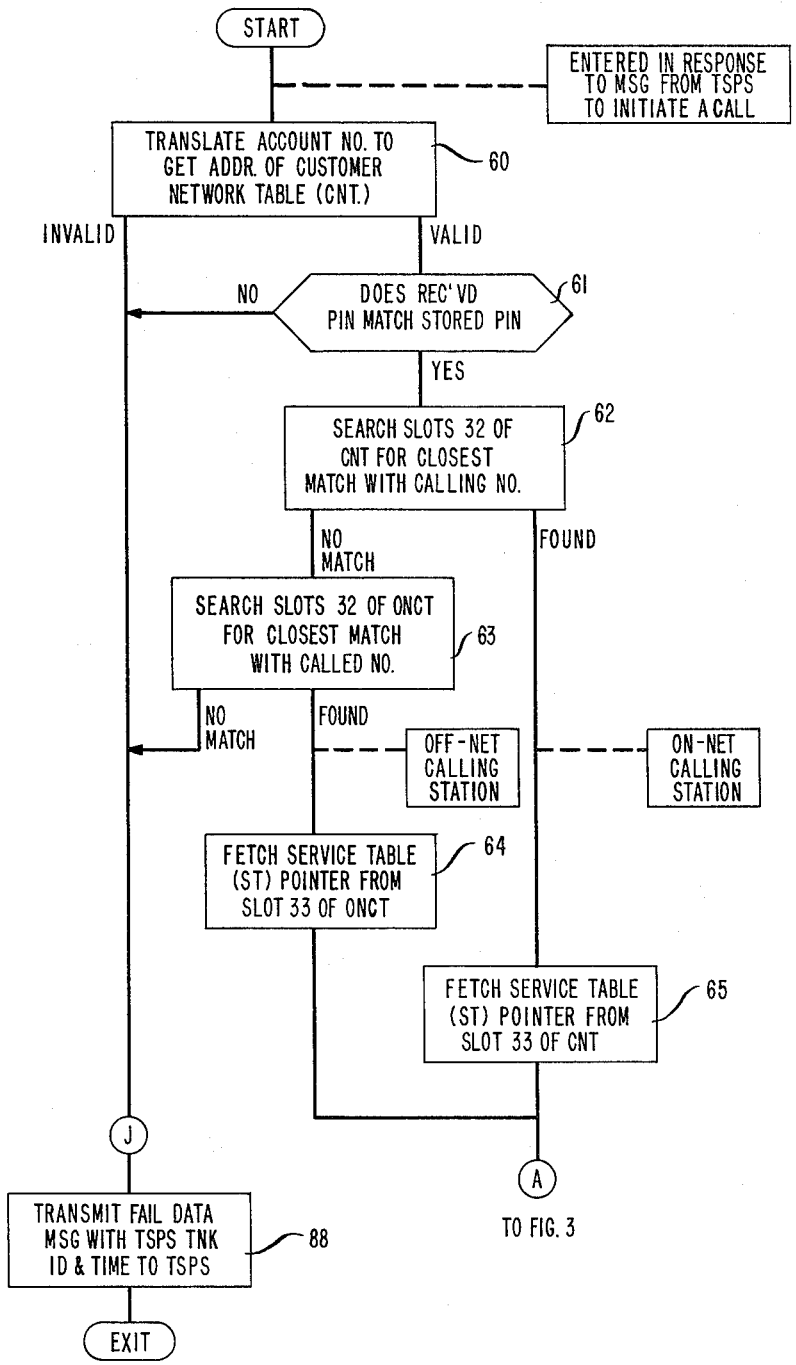
FIGS. 2 through 7 show flow diagrams for a data base program which controls the operation of a data base processor to provide virtual private network service.

In FIG. 2, the program first translates, at step 60, the account number to the memory address of the CNT pertaining to this corporate customer. If the translation fails because of an incorrect account number or for any other reason, the program will return a FAIL message to TSPS 12 as shown in step 88 of FIG. 2. The FAIL message will include the TSPS trunk identity and the assigned time as will all messages returned to the TSPS pertaining to this call.

Assuming that the translation in step 60 is successful, the program next reads the correct PIN for this account number from slot 30 of word 0 of the CNT and compares it to the PIN received from TSPS 12. This is performed at step 61. A FAIL message is returned if the PINs do not match. At step 62 a determination is made whether or not this call is from an on-network station. This is accomplished by searching slot 32 of each word of CNT for the closest match between the contents of these slots and the calling station number. By "closest match," what is meant is the slot 32 whose contents most narrowly define a calling area, office, or station that encompasses the calling station. If no match is found, the call is not from a station on the network. In this case the program examines ONCT to determine if the call is properly directed to a station on the network as will be explained.

In the instant case, the search at step 62 reveals that the contents (714-361) of slot 32 of CNT word 4 contains the closest match (the only match in this case) with the calling station number 714-361-1234. Since a match is found, it is determined that the call is from an on-network station. This fact is remembered by the program for later inquiry. This is not shown in the drawing, however, for simplicity. Slot 33 of CNT word 4 directs the program to service table ST3 at step 65.

Figure 3:
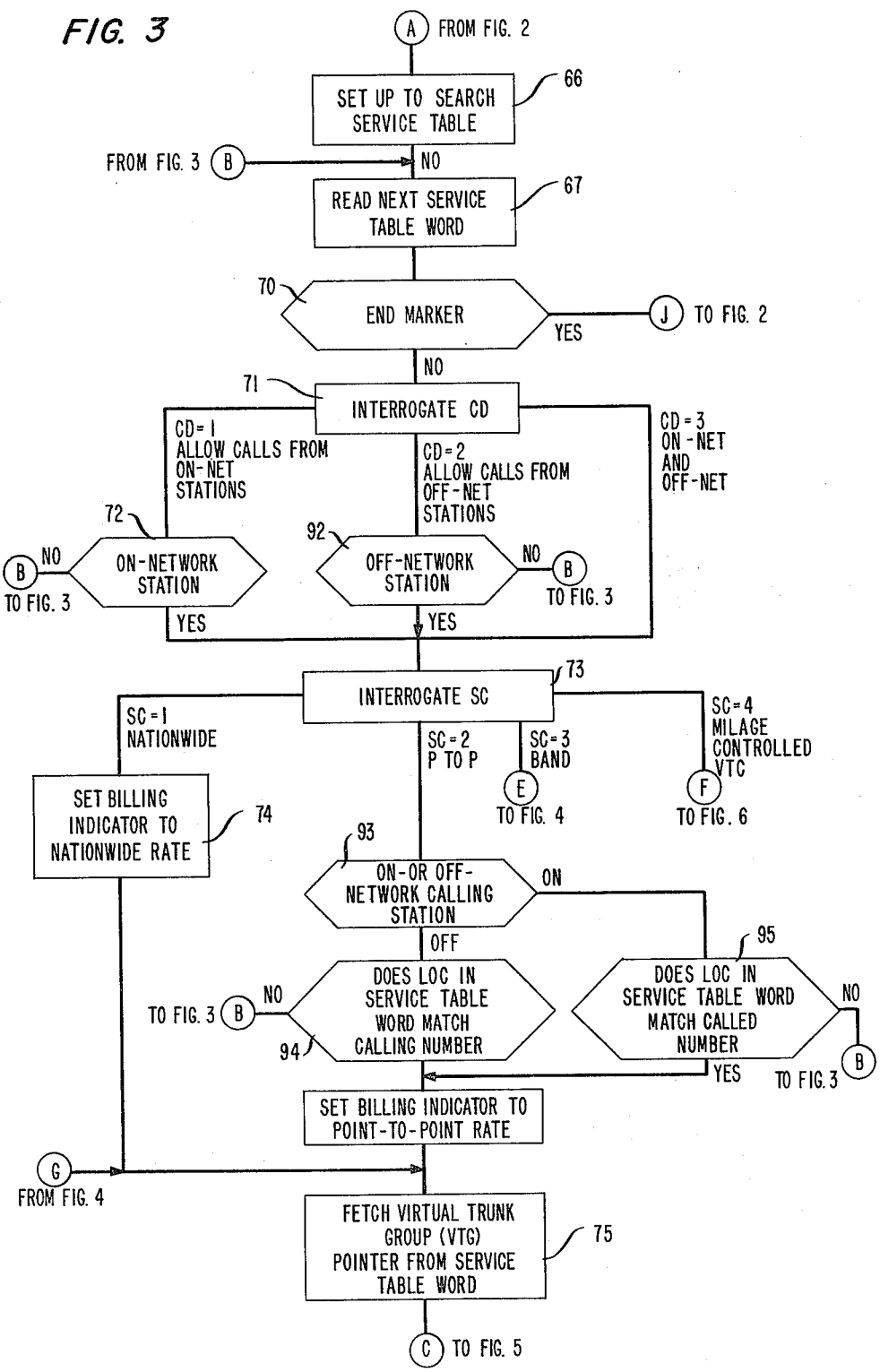
Figure 4:
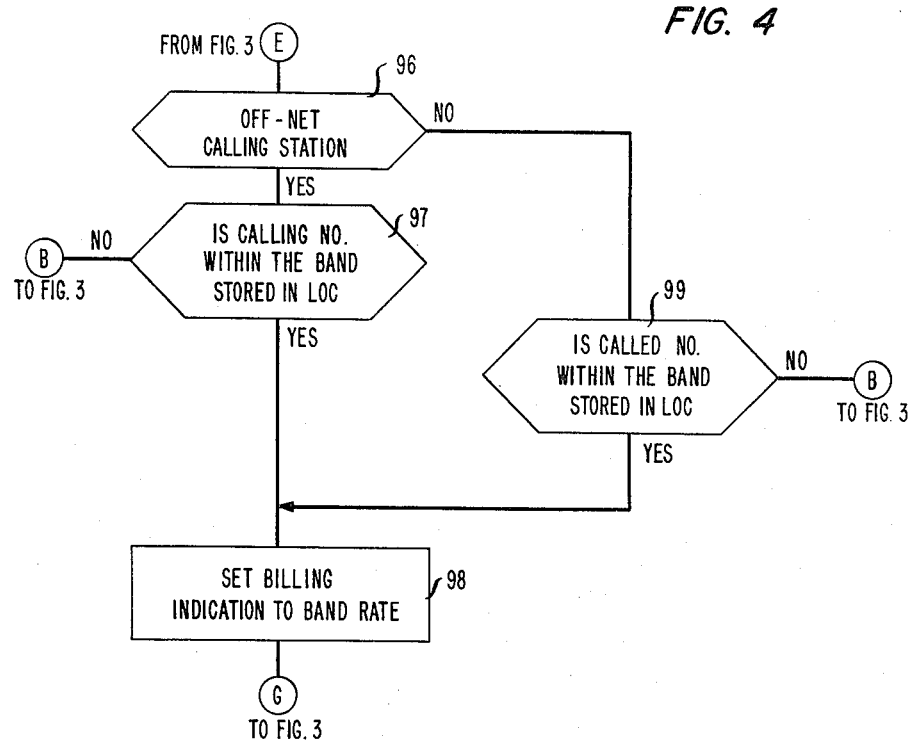
Figure 5:
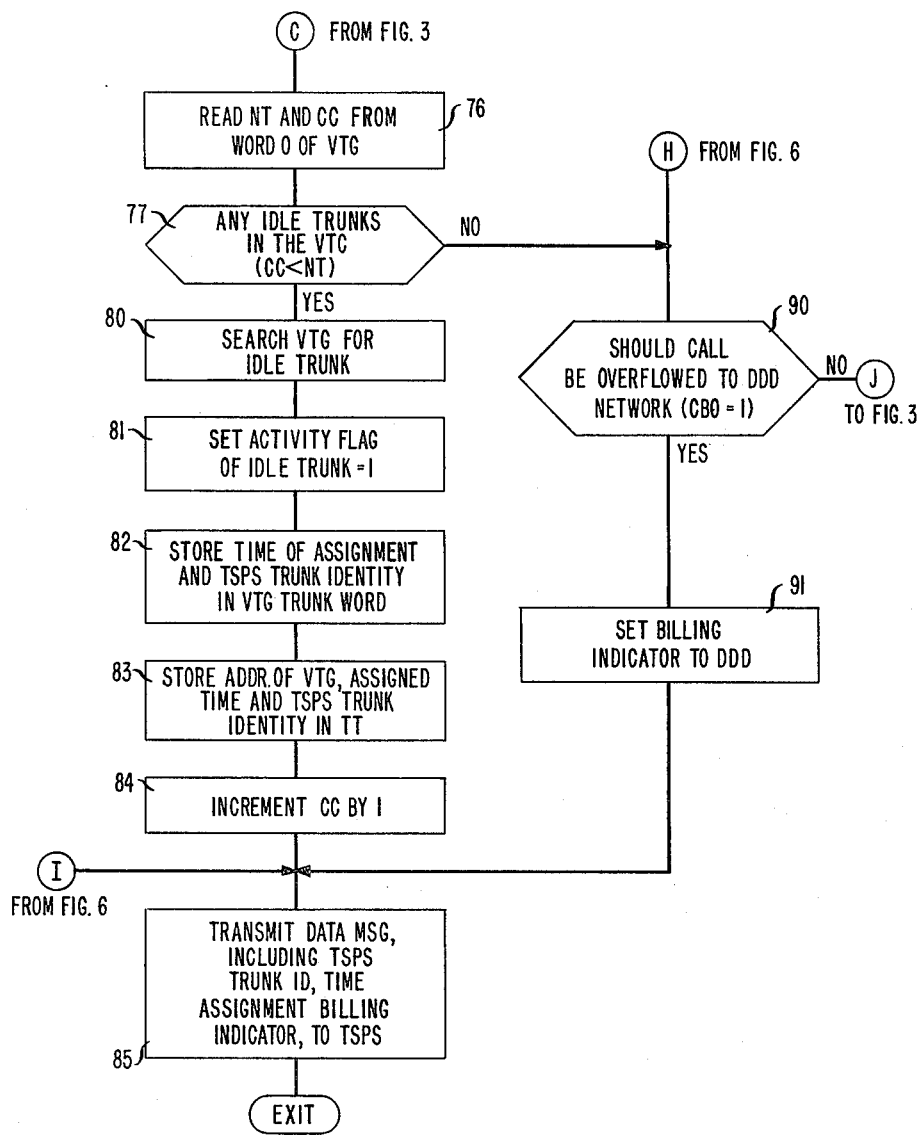

Beginning at step 66 in FIG. 3, the program searches all words of ST3 to determine if the particular call attempted is authorized for the virtual network. In the specific instance, however, ST3 has only one entry in word 0 which authorizes nationwide (SC=1) calls from both on- and off-network stations (CD=3). CD is interrogated at step 71. Since calls from both on- and off-network stations are allowed, there is no need to determine at this point which case applies here. Accordingly, SC is interrogated next at step 73. If CD had equaled 1 (calls from on-network stations allowed) or 2 (calls from off-network stations allowed), a determination would have to be made at steps 72 or 92, respectively, whether or not the call in question matched the CD criterion.

The interrogation of SC at step 73 indicates that nationwide service is authorized (SC=1). As a result, a billing indicator (not shown) is set at step 74 to indicate an appropriate nationwide billing tariff for this call. This indicator will eventually be returned to TSPS 12 so that the call can be properly billed. At step 75 the VTG (VTG1) designated to serve this call is obtained from slot 39 of ST3 word 0. The total number of virtual trunks (NT) and the number of virtual trunks currently in use (CC) in VTG1 are obtained from word 0 of VTG1, and CC is compared to NT to determine if any idle virtual trunks remain in the VTG. This is accomplished at steps 76 and 77 in FIG. 5. If no idle trunks remain (CC=NT), steps 90 and 91 are executed to determine the proper disposition of this call. Step 90 examines the Call Blocked Option indicator (CBO) in slot 38 of ST3 word 0. If CBO is set to "1," the customer has specified that blocked calls on this VTG should be overflowed to the public toll network. In reality, this is nothing more than the application of a different tariff to the call. Accordingly, the aforementioned billing indicator is set at step 91 to indicate a Direct-Distance-Dialed tariff.

Assuming that an idle virtual trunk in VTG1 is found at step 77, a specific idle trunk is located in VTG1 at step 80 by searching the activity flags 43 in each of the VTs. The activity flag of the first idle VT found is set to "1" at step 81 to mark it busy; the assigned time and the TSPS trunk identity received from TSPS 12 is stored in respective slots 44 and 45 of the VT. Next, at step 83 the address of VTG1, the assigned time, and the TSPS trunk identity are stored in the first available word of the Trunk Table (TT) in FIG. 10. The address of TT is obtained from word 1 of the CNT. An available word in TT may be defined by an "all-zero" state. The TT entry is used to facilitate the locating of a VT when a call is subsequently terminated as will be seen. At step 84, the contents of CC are incremented by "1" to update the count of the number of VTs in VTG1 that are in use. Finally, at step 85 a data message is formed and transmitted to TSPS 12 to allow it to complete the call. The data message includes the TSPS trunk identity and time assignment to identify the call and the billing indicator which informs the TSPS of the proper tariff to apply in billing the call.

To illustrate further the operation of the program, let it be assumed that a calling party in New York City (area code 212) initiates a call to the East Coast distribution center 17. Assume that the caller keys-in the initial digits 0-904-767-4258, and after connection to a TSPS (not shown), the caller keys-in the additional digits 205-497-3434-1112 (corporate account number) and 3313 (corporate PIN). The account number and PIN must have been given to the caller at a prior time.

The keyed-in digits are forwarded to data base 10 via a CCIS data link in a manner similar to that already described. In FIG. 2 the search of CNT at step 62 for the closest match between the calling number (area code 212) and CNT slot 32 data is unsuccessful. Accordingly, a search is performed at step 63 for the closest match between the called number (904-767-4258) and slot 32 data of ONCT. The closest match is found in word 2 of ONCT. As a result, an off-network calling indicator (not shown) is set for later reference to indicate that the call is from an off-network station to an on-network station. Slot 33 of word 2 points the program to service table ST2. Had no match been found, the program would have returned a FAIL message to the TSPS.

The program searches ST2 in a manner similar to that already described to determine if this call is authorized. At step 67 in FIG. 3, it reads word 0 of ST2. The interrogation of the call direction indicator CD of word 0 passes since it is set to 3 (calls from both off- and on-network stations allowed). The service code interrogation at step 73 indicates that a WATS service is authorized (SC=3). This causes the execution of step 96 in FIG. 4. Because this call is from an off-network station, the calling number is examined at step 97 to determine if it is within the allowed WATS band stored in slot 37 of ST2 word 0 with respect to the called station. As seen, the allowed band is 3, which it is assumed does not include a call from New York City to the 904 area code. Accordingly, the next word 1 of ST2 is examined beginning at step 67 in FIG. 3. In word 1 the calling direction indicator CD is set to 3 (allowing calls from on- and off-network stations), and the service code is set to 2 (point-to-point traffic). This causes the execution of step 93. Since this call is from a station off the network, the execution of step 93 causes the execution of step 94. At step 94, slot 37 (LOC) of ST2 is examined to determine if the geographical area stored therein matches the calling number. Since slot 37 stores the area code 212, this test passes. The billing indicator is set to indicate the appropriate tariff for band service. The program then proceeds to locate an idle VT in VTG3 in a manner as already described.

Figure 6:
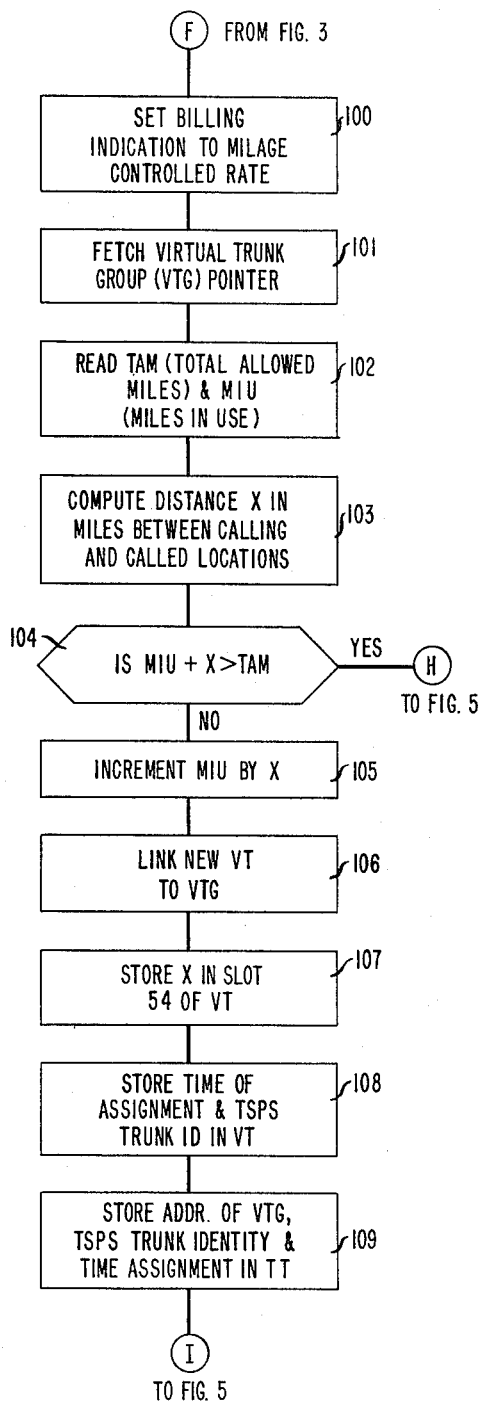
Figure 7:
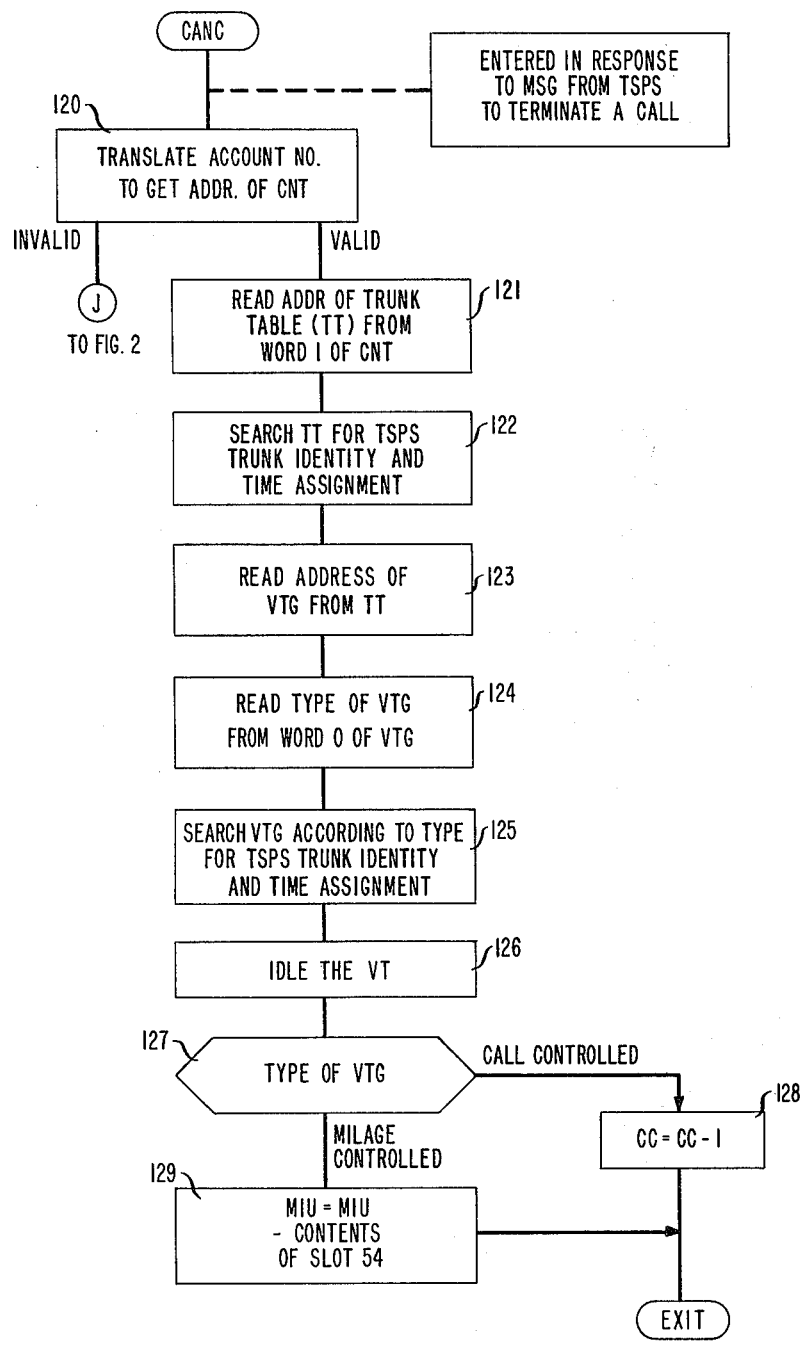

If the corporate customer had included a mileage controlled VTG in its network, a call to be completed on that VTG would cause the execution of the program FIG. 6. In this case the billing indicator would be set to reflect an appropriate tariff at step 100. The pointer to the VTG is read at step 101. At step 102 the total call miles allocated to the VTG and the call miles actively assigned to the VTG are read from TAM and MIU, respectively. The distance in call miles for the call being attempted is computed at step 103, and the contents of MIU plus the computed call distance are compared to the contents of TAM to determine if this call will exceed the allocated call miles. If not, MIU is incremented by the call distance (step 105); a new VT is linked to the VTG (step 106); the computed call distance is stored in slot 54 of the VT (step 107); the assigned time and trunk identity are stored in the VT (step 108); and the address of the VTG along with the call identification data is stored in TT (step 109). Finally, at step 85 in FIG. 5, a data message is returned to the TSPS to cause the completion of the call.

When a virtual private network call is terminated, the TSPS through which the call is routed forms a call termination data message containing the account number, the TSPS trunk identity and the time assignment and forwards the message to data base 10. This type of message causes the execution of program CANC in FIG. 7. The purpose of CANC is to update the VT records to reflect the termination of the call. At step 120, the account number is translated to the address of the CNT. Next, the address of the Trunk Table (TT) is read from CNT word 1 at step 121. TT is searched for the TSPS trunk identity and time assignment at step 122. The VTG containing the call record is obtained from TT, and the TT word is set to zero. At steps 124 and 125, the VTG is searched by TSPS trunk identity and time assignment according to its type (call controlled or mileage controlled) to locate the VT assigned to the call. When the VT is found, its activity flag is set to "0" at step 126 to idle the VT in the case of a call controlled VTG. A mileage controlled VT is delinked from the VTG. At steps 127 and 128, the contents of CC in word 0 of the VTG is decremented by 1 to update the count of the number of VTs currently in use if the VT is call controlled. In a mileage controlled VTG, the call miles in use stored in MIU are decremented by the contents of slot 54 of the VT at step 129. An acknowledgement message is returned to the TSPS. This final step, however, is not shown for simplicity.

Figure 12:
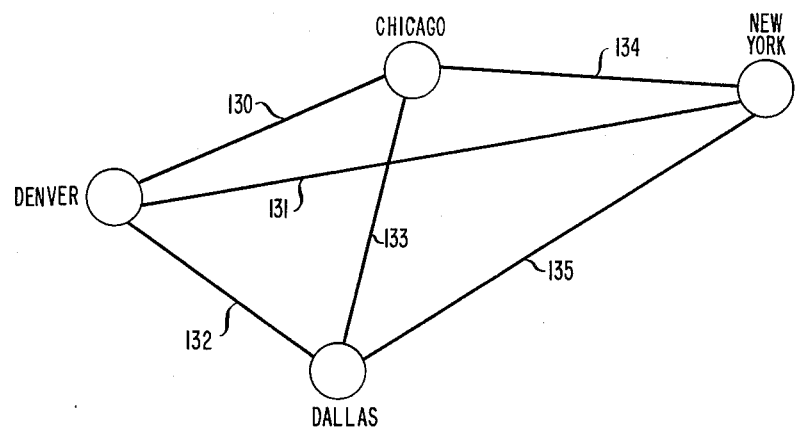
FIGS. 12 and 13 show graphically one way of providing alternate routing of calls among different virtual trunk groups in another illustrative virtual private network.

The foregoing preferred embodiment is illustrative only. Numerous other arrangements exist which are within the spirit and scope of the invention. For example, alternate routing via different VTGs is easily incorporated into the basic method taught herein. FIG. 12 geographically illustrates a virtual private network between four locations respectively in Denver, Dallas, Chicago, and New York. Each of the connections 130 through 135 illustratively represent a point-to-point VTG containing individually as many VTs as desired by the customer. Thus, 130, for example, represents a VTG between Denver and Chicago.

Figure 13:
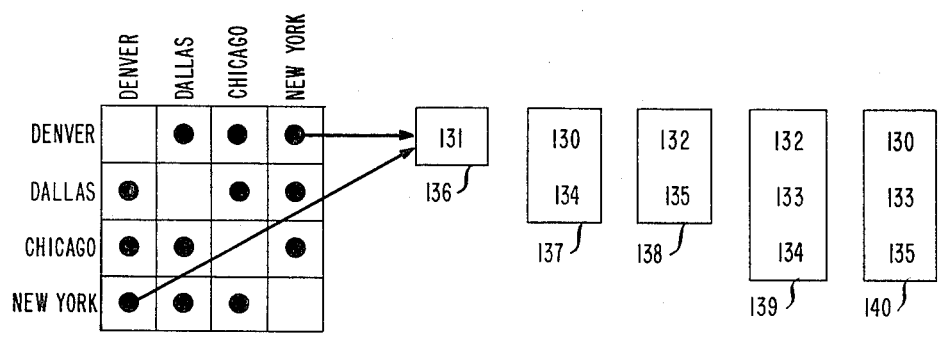

FIG. 13 shows a matrix which, by way of example, might be a memory table storing a memory address for each intersection of the matrix representing a VTG between two points. The dots in certain boxes of the matrix symbolically represent such memory addresses for the private network of FIG. 12. In addition, for the VTG between Denver and New York, FIG. 13 shows symbolically an illustrative alternate route selection that might be stored in an appropriate manner at the associated memory address. Similarly, alternating routing could be specified for calls between each of the other locations. For calls between Denver and New York, VTG 131 is first selected as shown by box 136. If no VTs are available in VTG 131, VTGs 130 and 134 are examined as shown by box 137 to see if both have at least one available VT. If so, a VT is selected from both to process the call. If this alternate routing is not possible, VTGs 132 and 135 (box 138) might be examined, followed in order of preference by VTGs 132, 133, 134 (box 139), and 130, 133, 135 (box 140).

In each of the above alternate routes, the call is actually completed over the public network in a conventional fashion. The billing for the call, however, might be in accordance with the number of VTs used in completing the call and the virtual distances in the respective VTGs.

Some customers might desire a service similar to INWATs (Incoming Wide Area Telephone Service) in which the customer wishes any party to be able to call certain customer stations. A hotel reservation service is a good example of this. This service could easily be incorporated into the illustrative embodiment. By way of example, a calling party might dial 0 plus the called number, followed by a special access code instead of an account number and PIN. The access code could be the same for all customers. It would inform the data base to use the called number to locate the CNT for the customer. A special table would be provided at the data base to perform the translation from called number to CNT memory address. The CNT would also have to include an appropriate indicator showing that this service is allowed.

Other arrangements may be easily devised to simplify the dialing sequences described herein. For example, stations that are defined to be on a virtual network can be permanently class-marked at a serving local office. Information derived from the class marks may be communicated from the local office to the data base directly if the office has access to the CCIS system, or special signaling sequences may be defined between the local office and a CCIS access point, such as a TSPS, if access is not provided for the local office. A classmarked arrangement could be used to eliminate the need for dialing the account number or credit card number, for example, from on-network stations.

I claim:

1. In a telephone system including a plurality of telephone offices (12, 18), a plurality of telephone stations (23), and a data base (10) accessible by ones of the offices, a method of providing private network types of services for prescribed ones of the stations via the public switched network, characterized by the steps of
    storing information at the data base defining a virtual private telephone network, said information including a description of the capacity of the virtual network in terms of virtual telephone facility resources of a prescribed type,
    responsive to a call received at one of the offices directed to the virtual private network, verifying at the data base that the call is entitled to be completed via the virtual network, and that an idle virtual resource remains for assignment to the call, assigning the idle resource to the call, and completing the call over the public switched network.

2. In a telephone system including a plurality of telephone offices (12, 18), a plurality of stations (23) served by the offices and a data base (10), a method of providing private network types of services for prescribed ones of the stations via the public switched network, characterized by the steps of
    storing at the data base a first indication (41) of a number of telephone facility resources of a certain type that are allocated for calls between the prescribed stations, and a second indication (42) of the total number of such resources that are assigned to calls at any given time,
    comparing the first and second indications responsive to a call from a calling one of the prescribed stations to a called one of the prescribed stations, and
    completing the call via the public switched network if said completion will not cause the number of assigned resources to exceed the allocated number of resources.

3. The invention of claim 2 further characterized by the steps of
    maintaining in storage at the data base in association with the first and second indications a virtual trunk group (VTG1) having one or more memory blocks (words 0, 1, etc.) each representing a virtual trunk,
    assigning one of the virtual trunks from the virtual trunk group to the call in response to the call, and
    updating the second indication to reflect the total said resources then in use on the virtual trunk group.

4. The invention of claim 3 wherein the allocated number of telephone facility resources is stated in terms of a maximum number of calls that may be assigned to the virtual trunk at any given time.

5. The invention of claim 3 wherein the allocated number of telephone facility resources is stated in terms of a maximum number of call miles associated with calls assigned to the virtual trunk at any given time.

6. The invention of claim 3 wherein the telephone system further comprises a data communication network (11, 24, 13) interconnecting the telephone offices and the data base, and said method further comprises the steps of
    storing at the data base information defining a virtual private network,
    responsive to the call, forwarding data identifying the calling station and the called station from a first one of the offices to the data base,
    verifying at the data base from the calling and called station identification data and the stored information whether the call is authorized to be completed via the virtual private network, and
    completing the call via the public switched telephone network if the call is authorized.

7. The invention of claim 6 further characterized by the steps of
    responsive to termination of the call, forwarding other data from the first office to the data base,
    removing the assignment of said one virtual trunk to the call responsive to the other data, and
    updating the second indication to reflect the new total of said resources then in use on the virtual trunk group.

8. The invention of claim 2 in which the storing of the first indication comprises storing a maximum number of calls that may be in progress at any given time, and in which the storing of the second indication comprises storing the number of calls currently in progress.

9. The invention of claim 2 in which the storing of the first indication comprises storing a maximum number of distance units that may be allocated to all calls between the prescribed stations at any given time, and the storing of the second indication comprises storing the total number of distance units assigned to calls between the prescribed stations at any given time.

10. The invention of claim 2 further characterized by the step of
    storing at the data base information defining a virtual private network between selected ones of the stations, said information including
    a first set of information (CNT) identifying a plurality of first groups of the selected stations that are allowed to initiate calls on the network, and
    a second set (ST1-ST3) of information identifying for each said first group one or more second groups of selected stations that may be accessed via the network by the first group.

11. The invention of claim 10 further characterized by the step of storing at the data base a third set of information (ONCT) identifying a plurality of third groups of the selected stations that are allowed to receive calls on the network, and a fourth set of information (ST1-ST4) identifying for each said third group one or more fourth groups of selected stations that may access the associated third group via the network.

12. The invention of claim 2 further characterized by the step of storing at the data base information defining a virtual private network between selected ones of the stations, said information including a first set of information (CNT) identifying a plurality of first groups of the selected stations that are defined as being on the network for purposes of initiating calls, and a second set of information (ONCT) identifying a plurality of second groups of the prescribed stations that are defined as being on the network for purposes of receiving calls from the network.

13. The invention of claim 12 further characterized by the step of storing at the data base a third set of information (ST1-ST4) identifying a plurality of third groups of stations and further defining the calling access from prescribed ones of the first groups to prescribed ones of the third groups.

14. The invention of claim 13 wherein the third set of information further defines the calling access from predetermined ones of the third groups to predetermined ones of the second groups.

15. The invention of claim 14 further characterized in that the third set of information comprises data identifying a said third group of stations by telephone area code.

16. The invention of claim 14 further characterized in that the third set of information comprises data identifying a said third group of stations by telephone area code and telephone office code.

17. The invention of claim 14 further characterized in that the third set of information comprises data identifying a said third group of stations by an individual station number.

18. The invention of claim 14 further characterized in that the third set of information comprises data identifying a said third group of stations by a prescribed code defining a predetermined geographical area.

19. The invention of claim 14 wherein each of the first through the third groups are identified individually by one of the following comprising telephone area code, area code and telephone office code, station number and prescribed arbitrary codes defining specified geographic areas.

20. The invention of claim 14 in which the stored information defining the virtual private network further includes a plurality of virtual trunk groups, wherein each virtual trunk group comprises a plurality of first memory blocks, each representing a virtual trunk, for recording data pertaining to calls assigned to the virtual trunk group.

21. The invention of claim 20 wherein each of the virtual trunk groups comprises in memory a number indicating the number of telephone facility resources that are allocated for calls associated with the individual virtual trunk group, and a number indicating the total number of the telephone facility resources that are assigned to calls on the virtual trunk at any given time.

22. The invention of claim 21 further characterized by the steps of transmitting a data message to the data base responsive to a call received at a first office directed to the virtual private network, said message including data identifying the calling and called stations, searching the first set of information to determine if the calling station is included in one of the first groups, and if the calling station is contained in one of the first groups, searching the third set of information to determine if the calling station is authorized to call the called station via the virtual private network.

23. The invention of claim 21 further characterized by the steps of searching the second set of information to determine if the called station is included in one of the second groups, and if the called station is in one of the second groups, searching the third set of information to determine if the calling station is authorized to call the called station via the virtual private network.

24. The invention of claim 22 wherein the third set of information comprises a plurality of second memory blocks (ST1, ST2, etc.) each associated with at least one group of the first and second groups, wherein each second memory block contains one or more subblocks (words 0, 1, etc.), wherein each subblock contains the indentity of a virtual trunk group, first data (35, 37) defining the bounds of the virtual private network pertaining to the group or groups of the first and second groups associated with the subblock, and second data (36) defining whether calls pertaining to the associated group or groups of the first and second groups may be originated from stations on or off the network.

25. The invention of claim 24 wherein the step of searching the third set of information to determine if the calling station is authorized to call the called station is characterized by interrogating the first and second data of the subblocks of the second block associated with one of the first groups containing the calling station to determine if the called station is contained within the bounds of the virtual network defined by that subblock.

26. The invention of claim 25 further characterized by obtaining the identity of a virtual trunk group to serve the call from an appropriate one of the subblocks, comparing the number of telephone facility resources that are currently assigned to calls on the virtual trunk group to the allocated number of such resources for the virtual trunk, and storing data identifying the call in one of the first memory blocks of the virtual trunk group if the allocated number of resources will not be exceeded by the call.

27. The invention of claim 20 wherein the stored information defining the virtual private network further includes an assignment of a prescribed virtual trunk group for call completion between at least one of the first groups of stations and at least one of the third groups of stations.

28. The invention of claim 20 wherein the stored information defining the virtual private network further includes an assignment of a prescribed virtual trunk group for call completion between at least one of the second groups of stations and at least one of the third groups of stations.

* * * * *